Patented Sept. 27, 1927.

1,643,393

UNITED STATES PATENT OFFICE.

EBENEZER EMMET REID AND GEORGE L. SCHWARTZ, OF WILMINGTON, DELAWARE, ASSIGNORS TO E. I. DU PONT DE NEMOURS & COMPANY, OF WILMINGTON, DELAWARE, A CORPORATION OF DELAWARE.

CYCLOHEXYL PHTHALATES AND PROCESS OF MAKING SAME.

No Drawing.   Application filed July 15, 1922. Serial No. 575,311.

This invention relates to cyclohexyl phthalates and includes broadly esters of phthalic acid in which the hydrogen radical of at least one of the two carboxyl groups is substituted by a cyclohexyl group.

The new class of esters includes the acid cyclohexyl phthalate, the neutral (or di-) cyclohexyl phthalate, and the mixed esters such, for example, on the one hand as cyclohexyl isopropyl phthalate, cyclohexyl n-butyl phthalate, cyclohexyl amyl phthalate, cyclohexyl benzyl phthalate, and other cyclohexyl alkyl phthalates, and on the other hand as cyclohexyl phenyl phthalate, cyclohexyl xylyl phthalate, and other cyclohexyl aryl phthalates, all of which esters have the following general graphical formula:

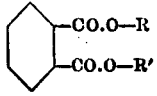

in which R stands for the cyclohexyl group, and R' represents a hydrogen, alkyl, or aryl radical.
These new products, and especially the cyclohexyl alkyl phthalates such as dicyclohexyl phthalate and cyclohexyl butyl phthalate constitute excellent softeners and camphor substitutes in the manufacture of cellulose nitrate coatings and plastics.

The process of making dicyclohexyl phthalate will be illustrated by the following example:

Two molecular proportions of cyclohexanol, (boiling point 158–174° C.—95% distilling at 161° C.), and one molecular proportion of phthalic anhydride, are heated together in a flask by an oil bath at 200–210° C. using a stream of nitrogen or other inert gas for sweeping out water as formed. The speed of the esterification increases with higher temperatures but decomposition begins at 260–265° C. and at 280° C. is more rapid than esterification. The best temperature is between 200 and 210° C. because at this temperature only a small amount of cyclohexanol is lost by distillation. A small amount of cyclohexanol is added toward the end of the reaction to compensate for an equivalent amount that is carried over by the stream of nitrogen. After neutralization is almost complete the product can be used without further purification, or if desirable it can be further neutralized by agitation with a calculated amount of calcium carbonate, separating the water from the ester and subsequently filtering.

The above method can be modified by using a catalyst such as small amounts of sulfuric acid which will accelerate the reaction but will make purification necessary at the end of the esterification stage. This neutral ester can also be prepared (1) from phthalic acid and cyclohexanol by heating the two substances together as described above; the acid, however, is more expensive than the anhydride. (2) By the reaction of phthalyl chloride on cyclohexanol.

The product (dicyclohexyl phthalate) when prepared from phthalic anhydride as described above is a transparent, viscous and odorless liquid with a slight amber color. On cooling it becomes more viscous and is a glass-like solid at −16° C. It colloids dry pyroxylin (containing 12% nitrogen) slowly at 21° C. and more readily at 50° C. It boils above 240° C. at 14 mm. pressure and its index of refraction is 1.5232 at 23.0° C. It distills with slight decomposition at 244–248° C. (uncorr.) under 4 mm. pressure, the distillate formed being a colorless, transparent liquid.

The process of making the mixed esters will be illustrated by a specific example describing the production of cyclohexyl normal-butyl phthalate, as follows:

One molecular portion of cyclohexanol and one molecular portion of phthalic anhydride are heated together several hours at 150° C. until analysis shows that practically all of the alcohol has been esterified. Normal butyl alcohol (about two molecular portions) is then added to the mixture and heated at a refluxing temperature under atmospheric pressure. The condenser is packed with glass rings or other condensing materials so that the butyl alcohol-water mixture, which boils below the boiling point of water, distils over. An excess of butyl alcohol is maintained in the reacting mixture until analysis shows that the acid has been practically neutralized, when the reflux condenser is changed to a distilling position and the temperature is raised gradually to 200° C. In the last stages of heating a stream of nitrogen is passed through the mixture to remove the last traces of butyl alcohol. Only a small amount of cyclohexanol is lost.

There is no certainty by this method of obtaining at will a mixed ester with the alcohols present in any definite molar ratio such as 1:1. However, the ratio of cyclohexanol to butyl alcohol that react can be approximately regulated so that any mixture of esters can be obtained grading from pure dibutyl phthalate through cyclohexyl butyl phthalate to dicyclohexyl phthalate, including mixtures of all of the pure and mixed esters that are possible from the two alcohols and the anhydride.

Both alcohols can be added in the initial stage of the reaction and the product that is obtained will be practically identical to that obtained from a method in which the cyclohexanol is esterified first.

Cyclohexyl butyl phthalate (containing cyclohexanol and butyl alcohol radicals in approximately equal ratio) is a transparent liquid of slight amber color with a very slight but agreeable odor. Its viscosity lies between that of dibutyl phthalate and dicyclohexyl phthalate. It has been held at −16° C. for one hour with agitation without freezing. It distils at 14 mm. between 205 and 250° C. without decomposition. The distilled liquid is colorless and has a refractive index of 1.5022 at 23.0° C. It colloids dry pyroxylin readily at 21° C. and rapidly at 50° C.

The above-mentioned esters, and particularly dicyclohexyl, and cyclohexyl butyl phthalate, can be used with pyroxylin (containing 12% nitrogen in the ratio of ester 0.60—pyroxylin 1.00 to ester 1.40—pyroxylin 1.00) for artificial leather coatings containing the usual amount of pigment. In clear pyroxylin coatings the ester ratio is correspondingly reduced. These esters can also be used to substitute small amounts of softener such as castor oil, in order to improve the pliability. They can also be used as camphor substitutes in the ratio of camphor that is regularly employed for celluloid or pyroxylin and for lacquers, or with pyroxylin for split leather coating. Their use is advantageous where a solvent softener is required with a vapor pressure considerably lower than that of dibutyl phthalate or camphor.

The cyclohexyl butyl phthalate, when prepared according to the process above-described, is associated, as has been indicated, with certain amounts of dibutyl phthalate and dicyclohexyl phthalate, which substances can be disregarded in so far as the use of the cyclohexyl butyl phthalate as a softener in pyroxylin coatings is concerned. Where it is desired, however, to obtain the cyclohexyl butyl phthalate in a pure form, the following procedure may be used:

The mono-butyl ester of phthalic acid is first prepared and isolated in any suitable way, for example as described in the application by one of us filed December 3, 1920, under Serial No. 428,018. The pure mono-n-butyl phthalate is converted into its sodium salt by neutralization with sodium hydroxide, and the sodium butyl phthalate, preferably dissolved in butyl alcohol, ethyl alcohol or other solvent, is then heated, preferably under a reflux condenser, with about one molecular proportion of cyclohexyl bromide (or chloride) until the reaction is completed. The reaction mixture segregates into two layers, the lower layer containing the cyclohexyl butyl phthalate. This lower layer is separated, washed first with sodium carbonate solution and then with water until neutral, and then heated to free it from alcohol, water, and any remaining cyclohexyl bromide. The product may be still further purified by distilling it under reduced pressure.

According to an alternative procedure for producing pure cyclohexyl butyl phthalate, sodium cyclohexyl phthalate is prepared in pure condition and treated with butyl bromide (or chloride) to form the cyclohexyl butyl phthalate, the impure product being then purified in the manner set forth above.

Substantially pure mono-cyclohexyl phthalate may be prepared by heating together for forty minutes in a flask by means of an oil bath (bath 175° C.), equal molecular portions of cyclohexanol (b. p. 158–174° C.—95% distilling at 161° C.) and phthalic anhydride. The mixture was then cooled and mixed with a slight excess of normal aqueous sodium hydroxide solution. A small amount of the di-cyclohexyl ester was formed in the reaction and it was removed from this mixture by extracting with benzene. The aqueous mixture was then mixed with a slight excess of sulfuric acid to liberate the mono-cyclohexyl phthalate which was extracted with ether. After three crystallizations from ether a constant melting, colorless, crystalline substance was obtained—m. p. 97.0–97.3° C.—(uncorr.). This contained 98.6% mono-cyclohexyl phthalate.

We claim:

1. As a new composition of matter, a cyclohexyl ester of phthalic acid having the following graphical formula:

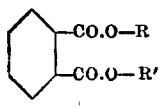

where R stands for the cyclohexyl group, and R' represents an open chain alkyl, or aryl radical.

2. As a new composition of matter, a cyclohexyl ester of phthalic acid having the following graphical formula:

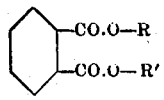

where R stands for the cyclohexyl group, and R' represents an open chain alkyl radical.

3. As a new composition of matter, a cyclohexyl ester of phthalic acid having the following graphical formula:

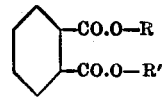

where R stands for the cyclohexyl group, and R' represents a butyl radical.

4. As a new composition of matter, a product comprising cyclohexyl n-butyl phthalate.

5. As a new composition of matter, a product consisting chiefly of cyclohexyl normal-butyl phthalate, and being a transparent liquid capable of colloiding dry pyroxylin at a temperature of 21° C.

In testimony whereof we affix our signatures.

EBENEZER EMMET REID.
GEORGE L. SCHWARTZ.